(12) United States Patent
Yang et al.

(10) Patent No.: US 8,037,614 B2
(45) Date of Patent: Oct. 18, 2011

(54) CUTTING MACHINE

(75) Inventors: Kai Yang, Jiangsu (CN); Kenji Abe, Anjo (JP)

(73) Assignee: Makita Corporation, Anjo-shi (JP)

( * ) Notice: Subject to any disclaimer, the term of this patent is extended or adjusted under 35 U.S.C. 154(b) by 249 days.

(21) Appl. No.: 12/379,996

(22) Filed: Mar. 5, 2009

(65) Prior Publication Data

US 2009/0223070 A1    Sep. 10, 2009

(30) Foreign Application Priority Data

Mar. 7, 2008  (CN) .......................... 2008 1 0084901

(51) Int. Cl.
*B27B 9/00*  (2006.01)
(52) U.S. Cl. ............................... 30/391; 30/376; 30/388
(58) Field of Classification Search ............... 30/391, 30/376, 374, 388, 124, 390, 123.3, 389, 170; 83/170, 171, 471.3, 581, 689
See application file for complete search history.

(56) References Cited

U.S. PATENT DOCUMENTS

| 1,830,579 | A | * | 11/1931 | Wappat | ........................... 30/391 |
| 5,539,985 | A | * | 7/1996 | Wershe | ........................ 30/123.3 |
| 6,173,499 | B1 | * | 1/2001 | Hegoas et al. | ............... 30/123.3 |
| 7,380,343 | B2 | * | 6/2008 | Yoshimura et al. | ............. 30/388 |
| 2004/0093743 | A1 | * | 5/2004 | Fukuoka | ........................ 30/391 |
| 2005/0160608 | A1 | * | 7/2005 | Tanimoto et al. | ............... 30/391 |
| 2005/0178256 | A1 | * | 8/2005 | Bocka et al. | .................. 83/170 |
| 2009/0165312 | A1 | * | 7/2009 | Haas et al. | ...................... 30/390 |

FOREIGN PATENT DOCUMENTS

| JP | A-2005-193572 | 7/2005 |
| JP | A-2007-517702 | 7/2007 |
| JP | A-2007-276306 | 10/2007 |
| WO | WO 2005/072921 A1 | 8/2005 |

* cited by examiner

*Primary Examiner* — Ghassem Alie
(74) *Attorney, Agent, or Firm* — Oliff & Berridge, PLC

(57) ABSTRACT

A technique is provided which is effective in preventing chips generated during cutting operation on a workpiece from being accumulated in a region ahead in a cutting direction. A representative cutting machine includes a motor, a blade, a body housing having a first region that houses the motor and a second region that covers the blade and projects forward of a front surface of the first region, a base, an angular plate, an outlet formed in the body housing, an opening and a blocking part. The blocking part prevents the air discharged from the outlet from flowing out laterally with respect to the moving direction of the base through a clearance between a front end of the second region and the one end of the angular plate and thereby helps the air discharged from the outlet flow into the opening.

6 Claims, 7 Drawing Sheets

CUTTING MACHINE

BACKGROUND OF THE INVENTION

1. Field of the Invention

The present invention relates to a cutting machine such as a hand-held circular saw and more particularly, to a technique of disposing of chips generated during cutting operation on a workpiece.

2. Description of the Related Art

Chips generated by operation of cutting a workpiece (particularly wood) using a hand-held circular saw are carried by air flow which is caused by rotation of a blade (saw blade) cutting the workpiece and passes through the inside of a blade case that covers substantially an upper half region of the blade and are then discharged from the rear of the blade case. Part of the chips, however, fly out forward and accumulate on the upper surface of the base or the upper surface of the workpiece ahead of the base, resulting in hiding a cutting line guide on the upper surface of the base or a cutting line marked on the workpiece under the chips. In order to solve such a problem, a technique is provided for blowing away the chips by utilizing cooling air used to cool a motor. For example, Japanese laid-open patent publication No. 2007-517702 discloses a chip disposal technique in which an outlet is formed in a front region of the motor housing in the vicinity of a connection between the motor housing and the blade case, and in which air used to cool the motor is blown obliquely from above onto a cutting region (in the vicinity of a cutting point between the saw blade and the workpiece) ahead of the base.

In the circular saw, an angular plate for bevel angle adjustment in bevel cutting operation is disposed on the upper surface of the base in front of the motor housing or forward of the motor housing in the cutting direction. Therefore, in the above-described known technique, a slit for air flow is formed in the angular plate, so that cooling air discharged from the outlet passes through the slit and blows onto a cutting region ahead of the base. However, for structural reasons, a clearance exists between the front end of the blade case and the end of the angular plate, so that cooling air discharged from the outlet flows out obliquely laterally through the clearance. As a result, the amount of air which is blown through the slit toward the cutting region decreases, so that the effect of blowing away chips by cooling air is lessened. Therefore, in this point, further improvement is required.

SUMMARY OF THE INVENTION

It is, accordingly, an object of the present invention to provide a technique which is effective in preventing chips generated during cutting operation on a workpiece from being accumulated in a region ahead in a cutting direction.

In a preferred embodiment according to the present invention, a representative cutting machine is provided to include a motor, a blade, a body housing, a base and an angular plate. The motor drives the blade, and the blade is caused to move forward in order to cut a workpiece. The body housing has a first region that houses the motor and a second region that covers the blade and projects forward of a front surface of the first region. The base is disposed below the body housing and can be placed on the workpiece. The angular plate is connected to the body housing such that the body housing can be tilted about a longitudinal axis with respect to the base and allows adjustment of inclination of the blade with respect to a lower surface of the base by tilting movement of the body housing. Further, the angular plate extends in front of the body housing in a direction transverse to the longitudinal direction, and one end of the angular plate in the extending direction is arranged in front of the second region. The cutting machine in this invention typically represents a circular saw, but it can be suitably applied to a grooving machine for grooving a workpiece by using a thick blade. Further, the manner of being "arranged in front" of the second region typically represents the manner in which the one end of the angular plate is opposed to the second region, but it also suitably includes the manner in which the one end of the angular plate extends near to a region in front of the second region.

In the preferred embodiment of this invention, the cutting machine further includes an outlet that is formed in the body housing and through which air is discharged forward after cooling the motor, an opening that is formed in the angular plate and guides the discharged air from the outlet toward a region ahead in a moving direction of the base, and a blocking part that prevents the air discharged from the outlet from flowing out laterally with respect to the moving direction of the base through a clearance between a front end of the second region and the one end of the angular plate and thereby helps the air discharged from the outlet flow into the opening. The "blocking part" in this invention may be any member which can fill the clearance between the front end of the second region and the one end of the angular plate, and its shape and size may be appropriately determined. Further, typically, the "blocking part" is integrally formed with the body housing, or formed as a separate member and thereafter fixed to the body housing. The manner of providing the blocking part is not limited to these manners, but it also suitably includes the manner of providing it on the angular plate, the manner of providing it both on the body housing and on the angular plate, and the manner of providing it on the upper surface of the base.

According to this invention, during cutting operation by the cutting machine, when air is discharged forward from the outlet of the body housing after cooling the motor, the discharged air is guided to a region ahead in the moving direction of the base through the opening of the angular plate arranged in front of the body housing. Structurally, the cutting machine has the outlet near the side of the blade when viewed from above. Therefore, if it is designed such that air discharged from the outlet flows in a direction that obliquely crosses a cutting line in order to efficiently blow the air onto the region ahead in the moving direction of the base, the air discharged from the outlet will flow forward along the outer wall surface of a portion of the second region which protrudes forward. Then the air will flow out laterally with respect to the moving direction of the base through a clearance between the front end of the second region at which the outer wall surface is terminated and the one end of the angular plate.

According to this invention, by provision of the blocking part, air discharged from the outlet can be prevented from flowing out through a clearance between the front end of the second region and the angular plate. As a result, the amount of air which is blown through the opening onto a region ahead in the moving direction of the base can be increased, so that chips in the region ahead of the base in the cutting direction, i.e. chips on the cutting line guide which is formed on the upper surface of the base for indicating the cutting position and on the workpiece (cutting line), can be effectively blown away.

According to a further embodiment of the present invention, the blocking part is disposed on the front end of the second region of the body housing and serves as a guide to guide the discharged air from the outlet to a region ahead in the moving direction of the base in the state in which the body housing is tilted around the longitudinal axis with respect to the base for bevel angle adjustment of the blade so that the second region is moved away from the one end of the angular plate. The blocking part typically extends linearly or obliquely from the front end of the second region and has a predetermined extent in the vertical and forward directions. According to this invention, in bevel cutting operation by using the cutting machine, air which flows forward along a forward protruding portion of the second region can be guided toward a cutting region ahead of the base by the blocking part. As a result, chips in a region ahead in the cutting direction can be blown away.

According to a further embodiment of the present invention, the opening is formed below the outlet and a lower surface of an inside wall of the opening is formed by an inclined surface inclined forward and downward. With this construction, air discharged from the outlet can be effectively blown onto a region ahead in the moving direction of the base.

According to a further embodiment of the present invention, a plurality of horizontally extending lateral slits are formed in the angular plate in an area adjacent to the opening and arranged in parallel one above another in a vertical direction, so that part of the air discharged from the outlet is led through the lateral slits and blown onto a region ahead in the moving direction of the base. According to this invention, the air discharged from the outlet can be blown onto a region ahead in the moving direction of the base not only through the opening but through the lateral slits. Other features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved cutting machines and method for using such cutting machines and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
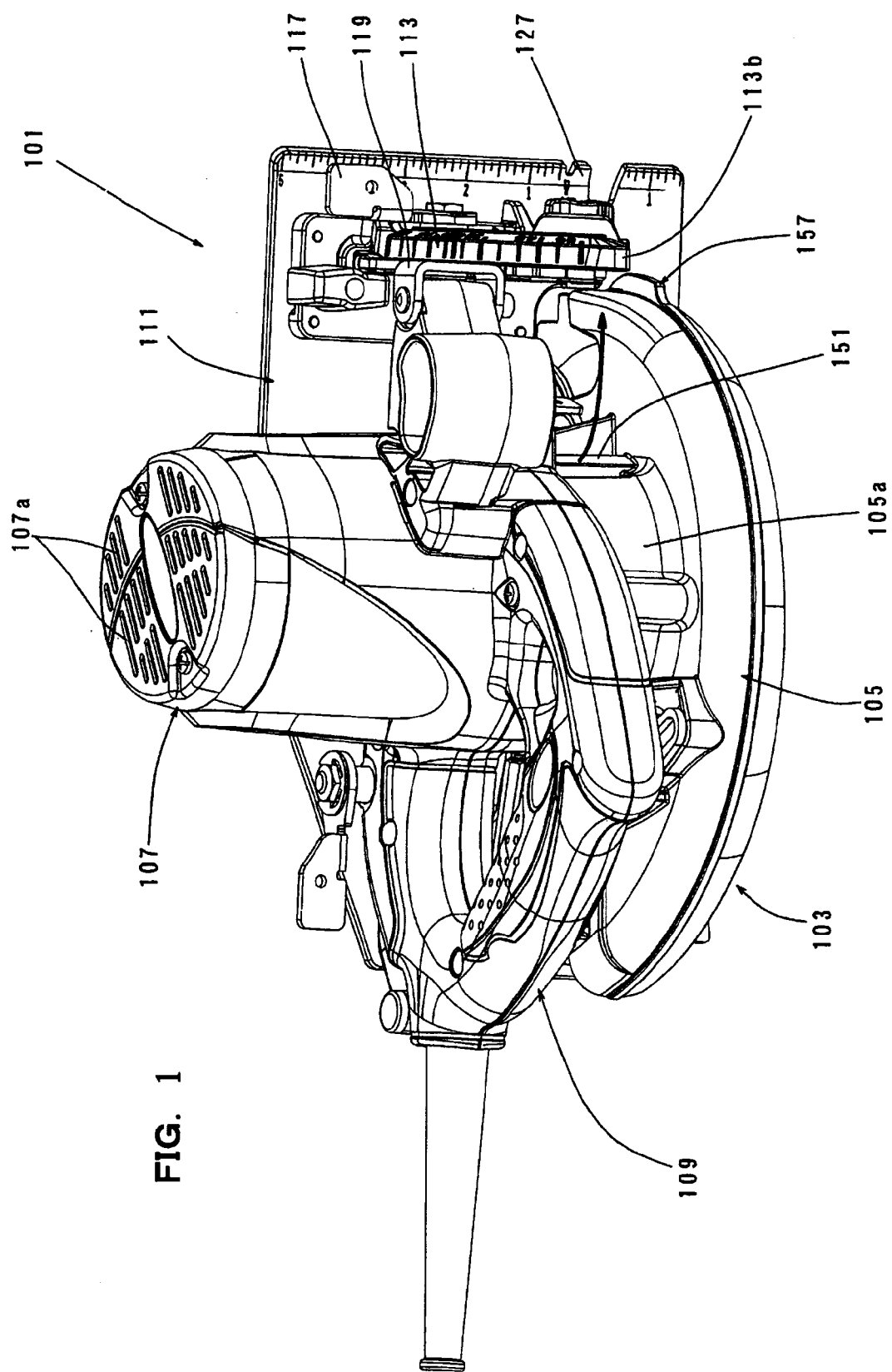
FIG. 1 is a perspective view showing an entire circular saw according to an embodiment of this invention.
Figure 2:
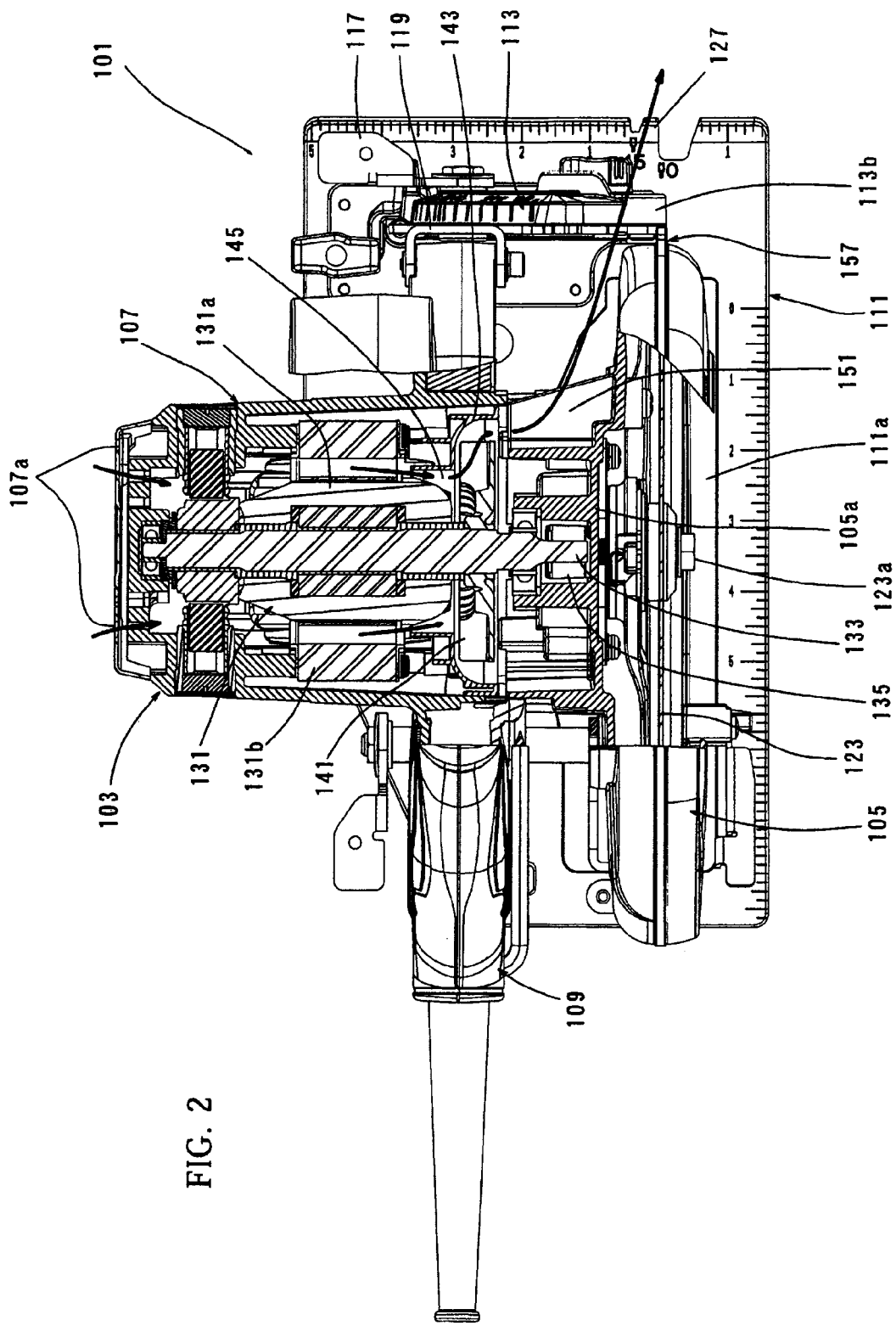
FIG. 2 is a sectional plan view of the entire circular saw.
Figure 3:
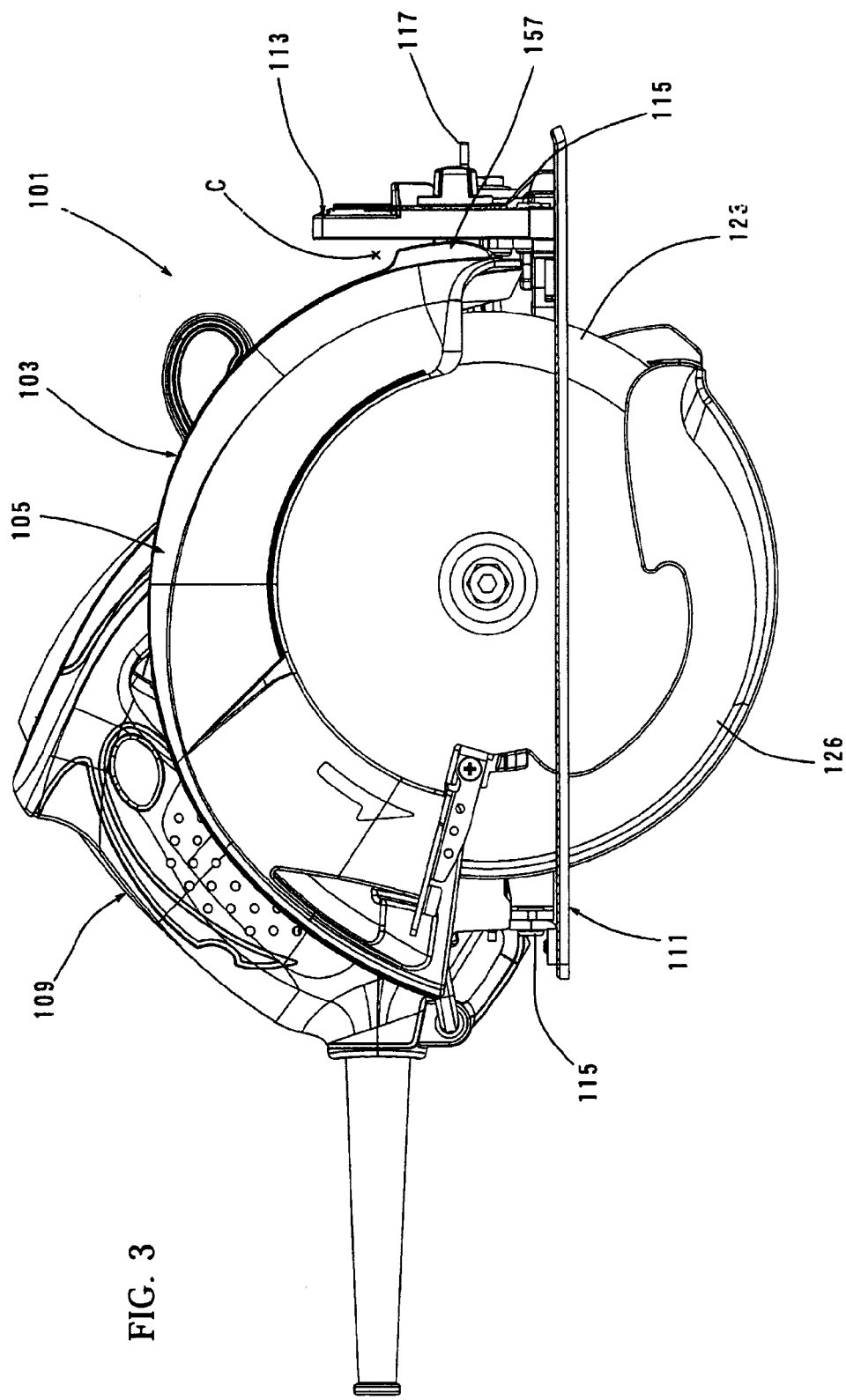
FIG. 3 is a front view of the entire circular saw.
Figure 4:
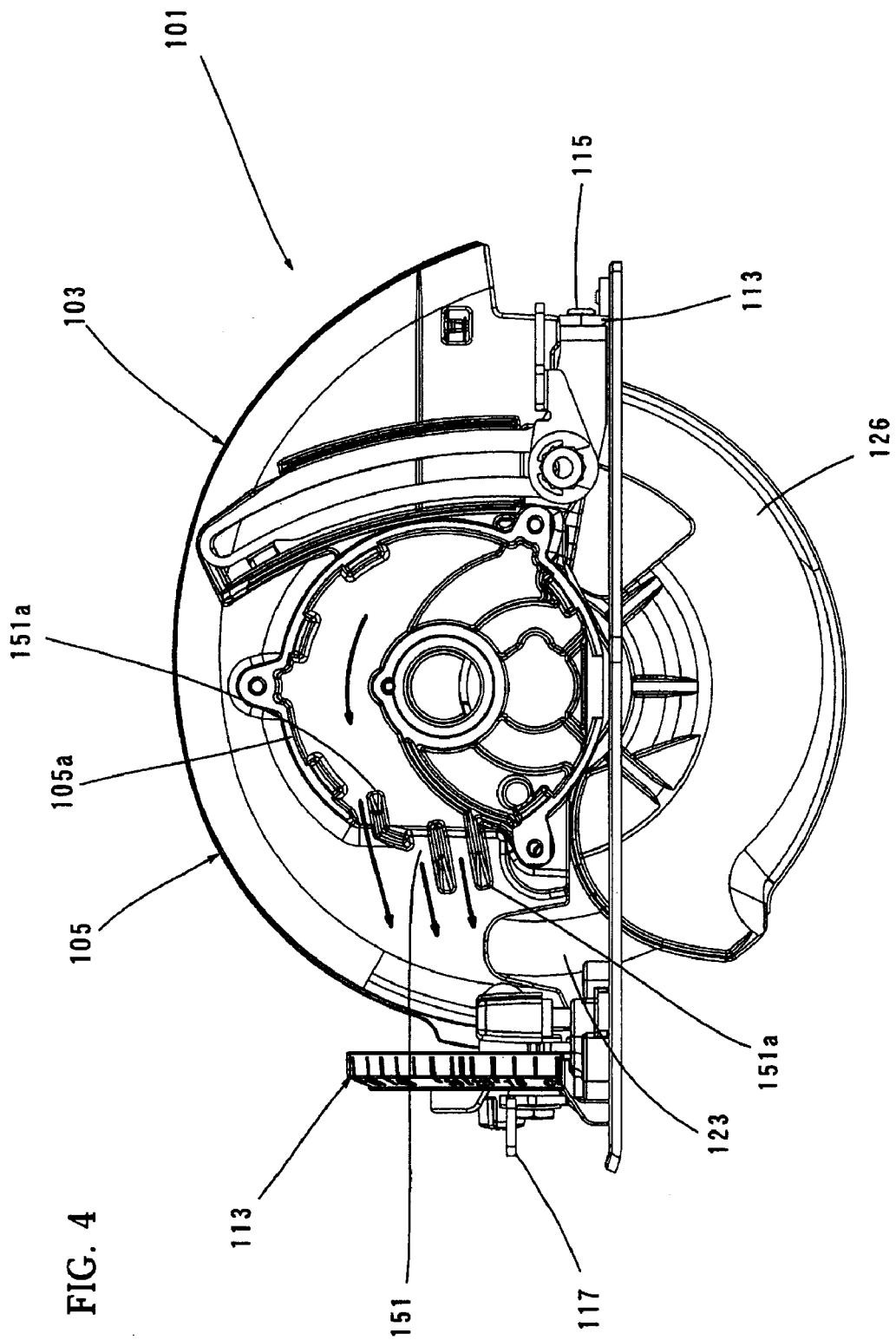
FIG. 4 is a sectional rear view of the entire circular saw.
Figure 5:
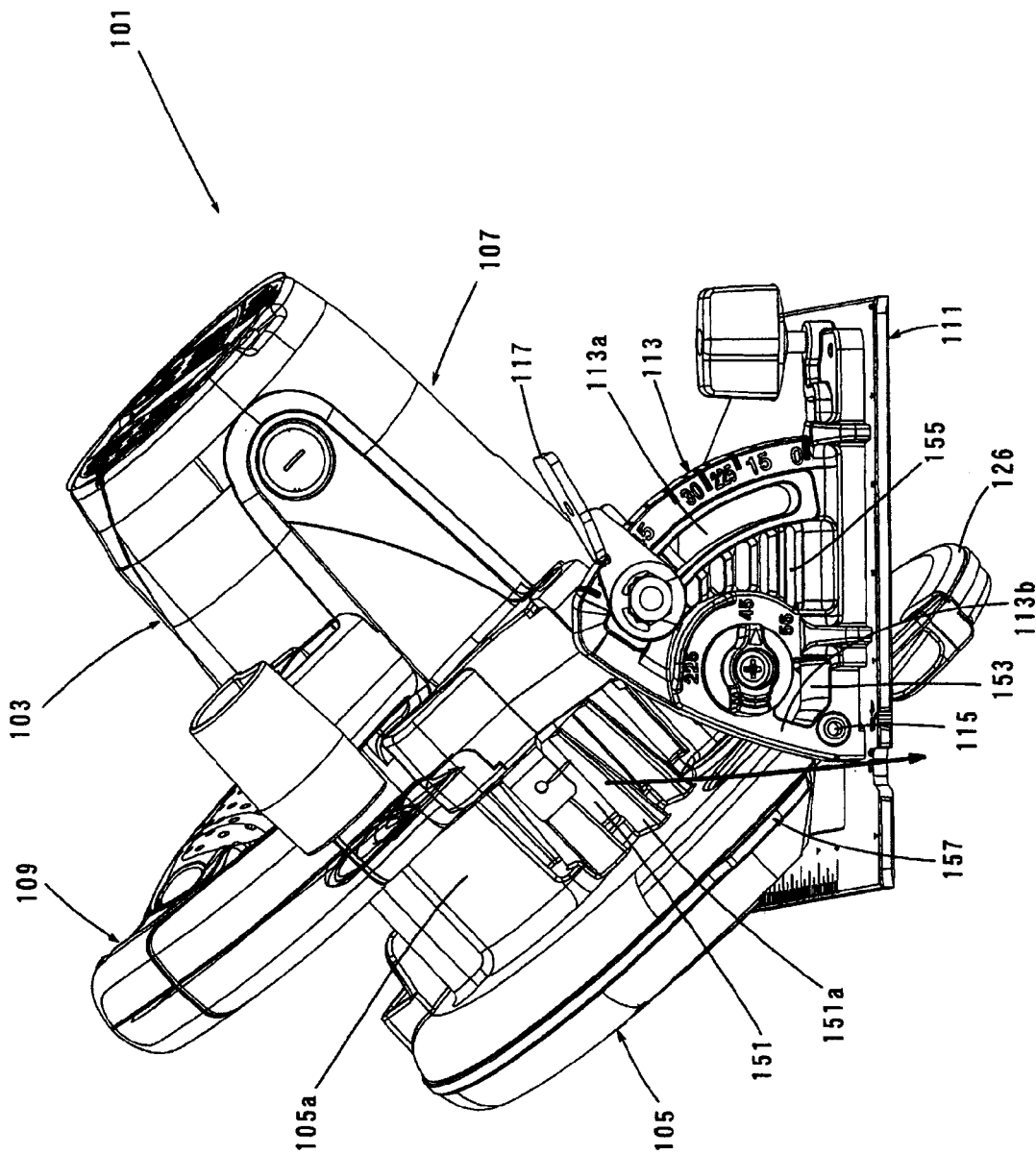
FIG. 5 is a side view showing a circular saw body inclined with respect to a base for bevel cutting operation.
Figure 6:
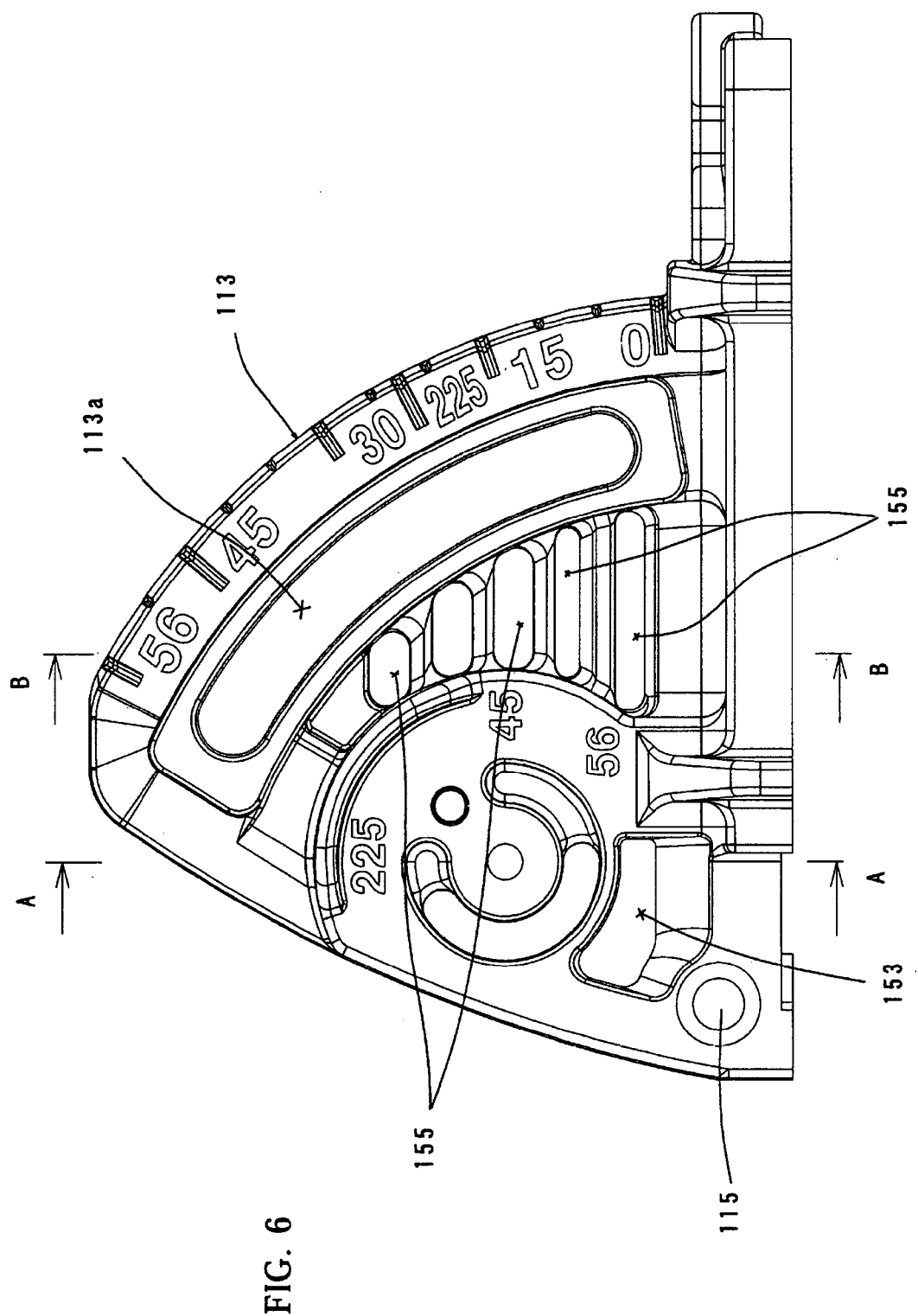
FIG. 6 is a side view of an angular plate.
Figure 7:
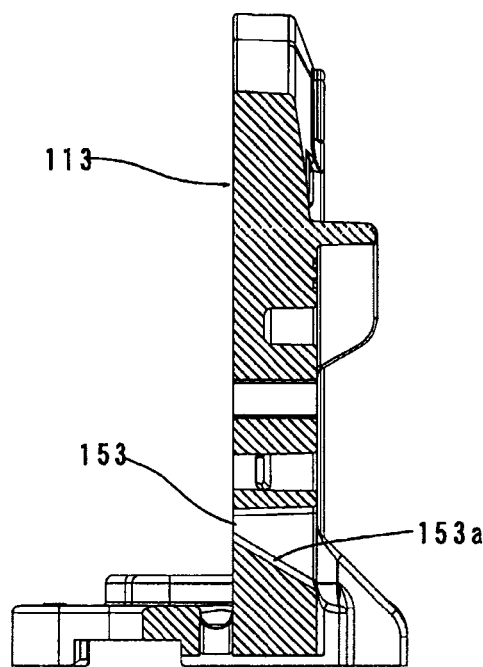
FIG. 7 is a sectional view taken along line A-A in FIG. 6.
Figure 8:
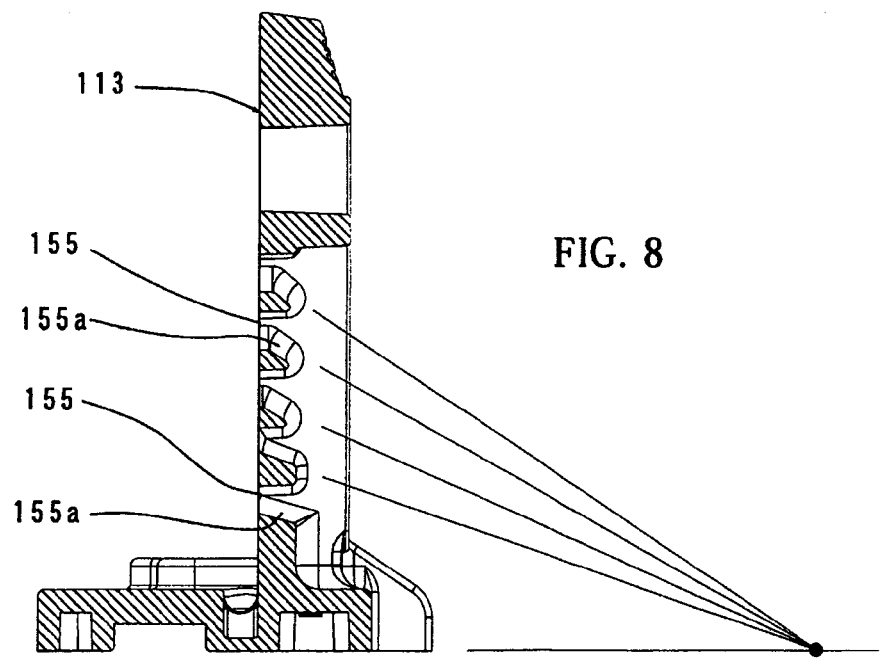
FIG. 8 is a sectional view taken along line B-B in FIG. 6.

An embodiment of the present invention is now explained with reference to FIGS. 1 to 8. FIG. 1 is a perspective view showing an entire hand-held circular saw 101 as a representative embodiment of the cutting machine according to the present invention. FIG. 2 is a sectional plan view of the entire circular saw 101. FIG. 3 is a front view of the entire circular saw 101. FIG. 4 is a rear view of the entire circular saw 101. FIG. 5 is a side view showing a circular saw body 103 inclined with respect to a base 111 for bevel cutting operation. Further, FIG. 6 is a side view of an angular plate 113. FIG. 7 is a sectional view taken along line A-A in FIG. 6. FIG. 8 is a sectional view taken along line B-B in FIG. 6.

As shown in FIGS. 1 to 5, the circular saw 101 according to this embodiment includes a base 111 which is placed on a workpiece in use and moved in a cutting direction, and a circular saw body 103 disposed on the base 111. The circular saw body 103 is a feature that corresponds to the "body housing" according to this invention.

The circular saw body 103 mainly includes a blade 123 that rotates in a vertical plane, a blade case 105 that covers substantially the upper half of the blade 123, a motor housing 107 that houses a driving motor 131 for rotationally driving the blade 123, and a handgrip (handle) 109 to be held by a user to operate the circular saw 101. The blade case 105 and the motor housing 107 are features that correspond to the "second region" and the "first region", respectively, according to this invention. A safety cover 126 is pivotally attached to the blade case 105 and covers the lower half of the blade 123. The lower edge portion of the blade 123 including the safety cover 126 protrudes from the underside of the base 111 through an opening 111a (see FIG. 2) of the base 111. For the sake of convenience of explanation, in the following description, the direction of moving the circular saw 101 with a front end of the base 111 placed on a workpiece when cutting the workpiece is referred to as the forward direction and the opposite direction as the rearward direction, and a horizontal direction transverse to the moving direction is as the lateral direction. Further, the workpiece is not shown in the drawings.

In cutting a workpiece, when the front end (right end as viewed in FIG. 2) of the base 111 is placed on the workpiece and moved forward (rightward as viewed in FIGS. 1 to 3), the workpiece pushes the front end of the safety cover 126, so that the safety cover 126 retracts and is housed within the blade case 105. The handgrip 109 is integrally formed on the upper portion of the motor housing 107 and has a trigger switch (not shown) that is operated to drive the driving motor.

As shown in FIG. 2, the driving motor 131 includes a rotor 131a that is rotatably disposed within the motor housing 107, and a stator 131b that is fastened within the motor housing 107 by fastening means such as screws. The driving motor 131 is arranged such that the direction of its axis of rotation extends perpendicularly to the direction of movement of the circular saw 101 or the cutting direction. The driving motor 131 is a feature that corresponds to the "motor" according to this invention. The driving motor 131 is disposed to the right of the blade 123 as viewed from the front such that an axis of rotation of an output shaft 133 of the driving motor 131 extends parallel to the axis of rotation of the blade 123. The rotating output of the driving motor 131 is transmitted from the output shaft 133 to a blade mounting spindle 123a on which the blade 123 is mounted, at a reduced speed via a gear-type power transmitting mechanism (of which one gear 135 is shown in FIG. 2). The gear-type power transmitting mechanism is housed within a gear housing part 105a that is integrally formed on the right side surface of the blade case 105 as viewed from the front. The motor housing 107 that houses the driving motor 131 is disposed to the right of the blade case 105 as viewed from the front and connected to the gear housing part 105*a* of the blade case 105.

For cutting operation using the circular saw 101 having the above-described construction, when a user holds the handgrip 109 of the circular saw 101 and depresses a trigger switch, the driving motor 131 is driven and the blade 123 is caused to rotate. In this state, the user places the front end of the base 111 on a workpiece and moves the base 111 forward while applying downward load to the base 111. Thus, the workpiece can be cut with the blade 123. Further, a cutting line guide 127 is provided as an indicating part that indicates the cutting position of the blade 123 on the front end upper surface of the base 111. Therefore, the user can perform the cutting operation while visually checking the cutting line guide 127 for the cutting position of the blade 123.

Further, the circular saw body 103 is mounted to front and rear angular plates 113 on the front and rear sides of the base 111 such that it can tilt in the lateral direction around pivots 115 (see FIG. 3) which extend through the associated angular plates 113 in the longitudinal direction of the circular saw body. Specifically, the circular saw body 103 is connected to the base 111 via the angular plates 113 such that it can tilt in the lateral direction around a longitudinal axis. A guide hole 113*a* (see FIG. 6) for bevel angle adjustment is formed on the right side of the front angular plate 113 and has a shape of an arc centering on the pivot 115. A lock screw 117 for bevel angle adjustment is screwed through the guide hole 113*a* into an angular guide 119 on the circular saw body 103 side. The angular plate 113 is locked to the angular guide 119 by tightening the lock screw 117, and the lock is released by loosening the lock screw 117.

Therefore, in the state in which the lock screw 117 is loosened, the bevel angle of the circular saw body 103 or the bevel angle of the blade 123 to the underside of the base 111 can be adjusted to a desired angle between a right angle position in which the blade 123 is at right angles to the underside of the base 111 and a maximum bevel angle position by tilting the circular saw body 103 about the pivot 115 in the lateral direction. After such bevel angle adjustment, the circular saw body 103 can be locked at the desired bevel angle by tightening the lock screw 117. In this manner, the circular saw 101 is provided for a bevel cutting operation which is performed with the blade tilted leftward as viewed from the front of the circular saw 101.

Further, the circular saw 101 also has a function of adjusting the amount of projection of the blade lower edge from the underside of the base 111 or adjusting the cutting dept, but this function is not directly related to this invention and thus its further description is omitted.

Next, a structure of blowing cooling air on the upper surface of the cutting line guide 127 and a region ahead of it in order to blow away chips is explained. Flow of cooling air is shown by thick arrows in the drawings.

A cooling fan 141 for leading cooling air into the motor housing 107 is mounted onto the output shaft 133 of the driving motor 131 such that the cooling fan 141 rotates together with the output shaft 133. The cooling fan 141 is a centrifugal fan and a baffle plate 143 is disposed behind the cooling fan 141. An air hole 145 (see FIG. 2) is formed in the center of the baffle plate 143. When the driving motor 131 is driven, the cooling fan 141 rotates and draws in the cooling air through an intake 107*a* formed in the end of the motor housing 107 by the suction force of the cooling fan 141. The cooling air drawn into the motor housing 107 flows to the gear housing part 105*a* side in the axial direction of the motor through a space between the rotor 131*a* and the stator 131*b* or a space between the stator 131*b* and the inside wall of the motor housing 107, and thereby cools the driving motor 131. Thereafter, the cooling air flows in the radial direction of the cooling fan 141 and is then changed in direction by the baffle plate 143. Then, while being further guided in the axial direction of the motor, the cooling air flows from the motor housing 107 into the gear housing part 105*a* of the blade case 105.

The gear housing part 105*a* has a cylindrical shape having a contour that matches the contour of the motor housing 107. The blade case 105 that covers the blade 123 has a larger diameter than the gear housing part 105*a*. Therefore, as shown, the blade case 105 protrudes a predetermined amount forward from the front surface of the gear housing part 105*a* or the front surface of the motor housing 107. An outlet 151 for discharging the cooling air forward is formed in the front surface of the gear housing part 105*a*. A plurality of horizontally (laterally) extending louvers 151*a* (see FIG. 4) are provided in the outlet 151 and oriented such that the cooling air discharged from the outlet 151 is led obliquely downward or toward the above-described cutting line guide 127 and a region ahead of it via the louvers 151*a*.

The front angular plate 113 is disposed toward a forward region to which the cooling air is discharged or in front of the circular saw body 103. As shown in FIG. 6, the angular plate 113 is generally triangular when viewed from the front and extends in a lateral direction transverse to the longitudinal direction. The angular plate 113 extends toward the front end of the blade case 105 that protrudes forward from the front surface of the motor housing 107, and its extending end or one (left) end of the angular plate 113 is substantially opposed to the front end of the blade case 105. A vent 153 is formed in a lower left corner or a region adjacent to the blade case 105 in the angular plate 113 and serves to guide the cooling air discharged from the outlet 151 toward the cutting line guide 127 and a region ahead of it. The vent 153 is a feature that corresponds to the "opening" according to this invention.

As shown in FIG. 6, the vent 153 is generally rectangular when viewed from the front. The vent 153 is disposed forward of and below the outlet 151. As shown in FIG. 7 in section, a lower surface of the inside wall of the vent 153 is formed by an inclined surface 153*a* inclined forward and downward in order to guide obliquely downward the cooling air flowing in from the outlet 151. Therefore, after the cooling air is discharged from the outlet 151 and led forward through the vent 153, it is blown on the cutting line guide 127 and a region ahead of it or a cutting line on the workpiece, so that chips on the cutting line guide 127 and on the workpiece can be blown away.

Further, a plurality of horizontally extending lateral slits 155 are formed in the angular plate 113 between the vent 153 and the guide hole 113*a* for bevel angle adjustment and arranged in parallel one above another in a vertical direction in order to pass forward the cooling air discharged from the outlet 151. Thus, the cooling air discharged from the outlet 151 flows forward not only through the vent 153, but through the lateral slits 155. Specifically, the cooling air discharged from the outlet 151 flows forward through the two flow passages, so that chips on the cutting line guide 127 and the workpiece can be blown away more strongly. Further, as shown in FIG. 8 in section, a lower surface of the inside wall of each of the lateral slits 155 is formed by an inclined surface 155*a* inclined forward and downward. The inclination angle of the inclined surface 155*a* is set such that the cooling air flowing forward through the lateral slit 155 is directed forward and concentrated to one particular region. Therefore, chips can be more efficiently blown away.

After the cooling air is discharged from the outlet while being guided by the baffle plate 143 in the direction of the rotation axis of the driving motor 131, it flows forward along the side surface of the blade case 105. Part of the cooling air may flow out laterally with respect to the moving direction of the base 111 through a clearance C (see FIG. 3) between the front end of the blade case 105 at which the side surface of the blade case 105 is terminated and the end 113b of the angular plate 113. As a result, the amount of air which blows out forward through the vent 153 may decrease.

In this invention, in order to prevent such outflow of the cooling air, a blocking plate 157 is integrally formed on the front end of the blade case 105. The blocking plate 157 is a feature that corresponds to the "blocking part" according to this invention. The blocking plate 157 extends vertically along the front end of the outer edge of the blade case 105. Further, the blocking plate 157 protrudes forward to such an extent that it is located nearest to the angular plate 113 while avoiding interference with the end 113b of the angular plate 113. The blocking plate 157 is formed in a position adjacent to the vent 153 and has a vertical extent longer than the vertical extent of the vent 153. Thus, the blocking plate 157 is provided in such a manner as to fill (lessen) the clearance C between the front end of the blade case 105 and the end 113b of the angular plate 113, while avoiding interference with the angular plate 113.

According to this embodiment, by providing the blocking plate 157 in the clearance C between the front end of the blade case 105 and the end 113b of the angular plate 113 in such a manner as to fill (lessen) the clearance C, the cooling air can be prevented from flowing out laterally through the clearance C, which can facilitates inflow of the cooling air into the vent 153. As a result, the amount of the cooling air which flows out forward through the vent 153 can be increased, so that chips on the cutting line guide 127 and a region ahead of it on the workpiece can be efficiently blown away.

As shown in FIG. 5, when the circular saw body 103 is tilted with respect to the base 111 in order to perform a bevel cutting operation with the circular saw 101, the blocking plate 157 formed on the blade case 105 is moved away from the end 113b of the angular plate 113. In this state, the cooling air discharged from the outlet 151 is guided by the blocking plate 157 through a space between the blocking plate 157 and the end surface of the end 113a of the angular plate 113 in its extending direction and to a region ahead 111 in the moving direction of the base 111. Specifically, in the state in which the circular saw body 103 is tilted with respect to the base 111 for bevel cutting operation, the blocking plate 157 serves as a guide to guide the cooling air to the cutting line guide 127 and a region ahead of it. Thus, during bevel cutting operation, the cooling air can also effectively blow away chips on the cutting line guide 127 and a region ahead of it.

In this embodiment, the blocking plate 157 is integrally formed on the blade case 105, but it may be separately formed and thereafter joined or fastened to the blade case 105. Further, the blocking plate 157 may be formed not on the blade case 105 but on the angular plate 113 or the base 111.

Further, in this embodiment, the circular saw 101 is described as a representative example of the cutting machine, but this invention may also be applied to a grooving machine.

DESCRIPTION OF NUMERALS 101 circular saw (cutting machine)
103 circular saw body (body housing)
105 blade case (second region)
105a gear housing part
107 motor housing (first region)
107a intake
109 handgrip
111 base
111a opening
113 angular plate
113a guide hole
113b end
115 pivot
117 lock screw for bevel angle adjustment
123 blade
126 safety cover
127 cutting line guide
131 driving motor
131a rotor
131b stator
133 output shaft
135 gear
141 cooling fan
143 baffle plate
145 air hole
151 outlet
151a louvre
153 vent (opening)
153a inclined surface
155 lateral slit
155a inclined surface
157 blocking plate (blocking part)

What we claim is:

1. A cutting machine comprising:
   a motor,
   a blade that is driven by the motor and caused to move forward to thereby cut a workpiece,
   a body housing having a first region that houses the motor and a second region that covers the blade and projects forward of a front surface of the first region,
   a base that is disposed below the body housing and can be placed on the workpiece, and
   an angular plate that is connected to the body housing such that the body housing can be tilted about a longitudinal axis with respect to the base and that allows adjustment of inclination of the blade with respect to a lower surface of the base by tilting movement of the body housing,
   the angular plate extending in front of the body housing in a direction transverse to the longitudinal direction, and one end of the angular plate in the extending direction being arranged in front of the second region, the cutting machine comprising:
   an outlet that is formed in the body housing and through which air is discharged forward after cooling the motor,
   an opening that is formed in the angular plate and guides the discharged air from the outlet toward a region ahead in a moving direction of the base, and
   a blocking plate that protrudes from the second region of the housing in a direction toward the angular plate and extends generally vertically along a front surface of the second region of the body housing, wherein the blocking plate prevents the air discharged from the outlet from flowing out laterally with respect to the moving direction of the base through a clearance between a front end of the second region and the one end of the angular plate and thereby helps the air discharged from the outlet flow into the opening.

2. The cutting machine as defined in claim 1, wherein the blocking plate is disposed on the front end of the second region and serves as a guide to guide the discharged air from the outlet to a region ahead in the moving direction of the base in the state in which the body housing is tilted around the longitudinal axis with respect to the base for bevel angle adjustment of the blade so that the second region is moved away from the one end of the angular plate.

3. The cutting machine as defined in claim 1, wherein the opening is formed below the outlet and a lower surface of an inside wall of the opening is formed by an inclined surface inclined forward and downward.

4. The cutting machine as defined in claim 3, wherein a plurality of horizontally extending lateral slits are formed in the angular plate in an area adjacent to the opening and arranged in parallel one above another in a vertical direction, so that part of the air discharged from the outlet is led through the lateral slits to a region ahead in the moving direction of the base.

5. A cutting machine comprising:
   a motor,
   a blade that is driven by the motor and caused to move forward to thereby cut a workpiece,
   a body housing having a first region that houses the motor and a second region that covers the blade and projects forward of a front surface of the first region,
   a base that is disposed below the body housing and can be placed on the workpiece, and
   an angular plate that is connected to the body housing such that the body housing can be tilted about a longitudinal axis with respect to the base and that allows adjustment of inclination of the blade with respect to a lower surface of the base by tilting movement of the body housing,
   the angular plate extending in front of the body housing in a direction transverse to the longitudinal direction, and one end of the angular plate in the extending direction being arranged in front of the second region, the cutting machine comprising:
   an outlet that is formed in the body housing and through which air is discharged forward after cooling the motor,
   an opening that is formed in the angular plate and guides the discharged air from the outlet toward a region ahead in a moving direction of the base, and
   a blocking means that protrudes from the second region of the housing in a direction toward the angular plate and extends generally vertically along a front surface of the second region of the body housing, for preventing the air discharged from the outlet from flowing out laterally with respect to the moving direction of the base through a clearance between a front end of the second region and the one end of the angular plate and thereby helps the air discharged from the outlet flow into the opening.

6. The cutting machine as defined in claim 4, wherein each of the plurality of horizontally extending lateral slits comprises a horizontal width component and a vertical height component, wherein the horizontal width component is larger than the vertical height component.

* * * * *